(12) United States Patent
Nishiyama

(10) Patent No.: US 8,830,113 B2
(45) Date of Patent: Sep. 9, 2014

(54) METHOD AND PROGRAM FOR DETECTING OBJECT OF INTEREST, AND RADAR DEVICE

(75) Inventor: Koji Nishiyama, Nishinomiya (JP)

(73) Assignee: FURUNO Electric Company Limited, Nishinomiya, Hyogo-Pref. (JP)

( * ) Notice: Subject to any disclaimer, the term of this patent is extended or adjusted under 35 U.S.C. 154(b) by 392 days.

(21) Appl. No.: 13/277,521

(22) Filed: Oct. 20, 2011

(65) Prior Publication Data

US 2012/0127013 A1 May 24, 2012

(30) Foreign Application Priority Data

Nov. 18, 2010 (JP) ................. 2010-258098

(51) Int. Cl.
*G01S 7/41* (2006.01)
*G01S 13/89* (2006.01)
*G01S 13/04* (2006.01)

(52) U.S. Cl.
CPC .............. *G01S 13/89* (2013.01); *G01S 7/412* (2013.01); *G01S 13/04* (2013.01)
USPC ............................... 342/27; 342/90; 342/179

(58) Field of Classification Search
CPC ............ G06K 9/6202; G06K 9/00369; G06K 9/00771; G06K 9/6293; G06K 9/3216; G06K 9/4609; G06T 2207/30196; G06T 2207/30232; G01S 13/86; G01S 7/411
USPC .................. 342/27, 28, 90, 179, 189, 197
See application file for complete search history.

(56) References Cited

U.S. PATENT DOCUMENTS 4,906,940 A * 3/1990 Greene et al. ................ 382/100
7,242,988 B1 * 7/2007 Hoffberg et al. ............... 700/28
7,768,537 B2 * 8/2010 Tognoni et al. ............... 345/672
8,045,759 B2 * 10/2011 Mizutani et al. .............. 382/103
8,248,296 B2 * 8/2012 Maeno et al. .................. 342/96
8,270,730 B2 * 9/2012 Watson ......................... 382/218
8,400,502 B2 * 3/2013 Zakrzewski et al. .......... 348/122
8,570,213 B2 * 10/2013 Nishiyama .................... 342/179
2003/0215141 A1 * 11/2003 Zakrzewski et al. .......... 382/190
2004/0008206 A1 * 1/2004 Tognoni et al. ............... 345/589
2004/0041725 A1 3/2004 Matsuda et al.
2006/0291696 A1 * 12/2006 Shao et al. .................... 382/103
2009/0066490 A1 * 3/2009 Mizutani et al. ............. 340/435
2010/0002942 A1 * 1/2010 Watson ......................... 382/218
2010/0231418 A1 * 9/2010 Whitlow et al. .............. 340/945
2012/0106797 A1 * 5/2012 Wang ............................ 382/103

FOREIGN PATENT DOCUMENTS

| EP | 1146472 A3 * | 5/2003 |
| EP | 2487647 A1 * | 8/2012 |
| GB | 2448801 A * | 10/2008 |
| JP | 3794361 B2 | 7/2006 |
| JP | 2010-20460 A | 1/2010 |
| KR | 20030046323 A * | 6/2003 |
| WO | WO 2012016374 A1 * | 2/2012 |

* cited by examiner

*Primary Examiner* — John B Sotomayor
(74) *Attorney, Agent, or Firm* — Birch, Stewart, Kolasch & Birch, LLP

(57) ABSTRACT

This disclosure provides a radar device, which detects an object of interest from image data produced based on an input signal containing echo signals caused by transmitted signals reflecting on objects. The radar device includes a memory module for storing template image data produced based on one or more characteristics of the echo signals of the object of interest, a pattern matching module for performing pattern matching of the image data and the template image data, an identifying module for identifying an area within the image data containing the object of interest corresponding to the template image data, when the object of interest is detected from the image data as a result of the pattern matching.

12 Claims, 12 Drawing Sheets

METHOD AND PROGRAM FOR DETECTING OBJECT OF INTEREST, AND RADAR DEVICE

CROSS-REFERENCE TO RELATED APPLICATION(S)

The application claims priority under 35 U.S.C. §119 to Japanese Patent Application No. 2010-258098, which was filed on Nov. 18, 2010, the entire disclosure of which is hereby incorporated by reference.

TECHNICAL FIELD

The present invention relates to a method, a program, and a radar device for detecting an object of interest from an image data produced based on echo signals caused by transmitting signals reflecting on an object.

BACKGROUND OF THE INVENTION

Conventionally, there are various radar devices for detecting an object within a detection area by transmitting electromagnetic wave signals to the detection area. The radar devices form a detection image of the detection area by receiving echo signals which are caused by the transmitted electromagnetic wave signals reflecting on the object. Then, the radar devices display the formed detection image on a display module. Thus, a user can visually recognize the object within the detection area by viewing the detection image. When this kind of radar device is carried on a ship to detect objects around the ship, the radar device receives echo signals reflected on various objects, such as land, birds, other ships, banks, and/or buoys, as well as receives noise signals. For this reason, the user may suffer difficulties in distinguishing whether displayed echoes are object or noise.

JP3794361B2 discloses an atmospheric observation radar signal processing device which removes abnormal echo signals due to birds passing through the sky above the device while accurately performing atmospheric observation using wind velocity instruments etc. . . . The device particularly removes the abnormal echo signals reflected on birds without removing necessary echo signals reflected on geographical features which can be identified comparatively easily. Thereby, the user can acquire information only related to atmospheric observation.

However, when removing echo signals that are not easily identifiable, the conventional device may also remove echo signals reflected on objects for which the user needs information.

SUMMARY OF THE INVENTION

Thus, the present invention is made in view of the above situations and provides a method, a program, and a radar device for accurately detecting a specific object based on image data.

According to one aspect of the present invention, a radar device is provided, which detects an object of interest from image data produced based on an input signal containing echo signals caused by transmitted signals reflecting on objects. The radar device includes a memory module for storing template image data produced based on one or more characteristics of the echo signals of the object of interest, a pattern matching module for performing pattern matching of the image data and the template image data, an identifying module for identifying an area within the image data containing the object of interest corresponding to the template image data, when the object of interest is detected from the image data as a result of the pattern matching.

With this configuration, even if the image data is produced from the echo signals from to two or more objects, it can detect only the object of interest by the pattern matching between the image data and the template image data. Moreover, since the template image data is produced based on one or more characteristics of the echo signals of the object of interest, its accuracy for detecting the object of interest improves by the pattern matching.

In one embodiment, the template image data may be produced based on pulse width and signal strength of the echo signals corresponding to the object of interest, and based on an occupancy rate of the echo signals corresponding to the object of interest with respect to the input signal.

This configuration shows a particular example of the characteristics of the echo signals of the object of interest to produce the template image data.

In one embodiment, the template image data may be produced based on a combination of a size of the object of interest, a brightness of the image data when the image data is produced based on the echo signals reflected on the object of interest, and a particle size indicative of an occupancy rate of the image data with respect to the image data produced based on the input signal.

This configuration shows a particular example of the template image data produced based on the size of the object of interest, and the brightness and the particle size of the image data.

In one embodiment, when the object of interest is a flying object smaller than a predetermined size, the template image data may be produced so that the brightness of the image data is below a threshold and the particle size of the image data is above a threshold.

This configuration shows a particular example of the template image data in a case where the object of interest is a flying object smaller than the predetermined size, such as a bird, a balloon, or hail (ice grain). The predetermined size is a value which may be set based on an experimental value or from experience depending on the application of the radar device. The threshold is a value that may be set based on an experimental value or from experience depending on the type of the flying object. Note that the flying object may include a group of two or more flying objects.

In one embodiment, when the object of interest is an animal smaller than a predetermined size, the template image data may be produced so that the brightness of the image data is below a threshold and the particle size of the image data is above a threshold.

This configuration shows a particular example of the template image data in a case where the object of interest is an animal, a bird, or a small animal. The predetermined size is a value which may be set based on an experimental value or from experience depending on the application of the radar device. The threshold is a value which may be set based on an experimental value or from experience depending on the type of the animal.

In one embodiment, when the object of interest is an immobile object, the template image data may be produced so that the brightness of the image data is above a threshold and the particle size of the image data is below a threshold.

This configuration shows a particular example of the template image data in a case where the object of interest is an immobile object, such as land. The threshold is a value which may be set based on an experimental value or from experience depending on the type of the immobile object.

In one embodiment, when the object of interest is an artificial mobile object larger than a predetermined size, the template image data may be produced so that the brightness of the image data is above a threshold and the particle size of the image data is above a threshold.

This configuration shows a particular example of the template image data in a case where the object of interest is an artificial mobile object, such as a ship or an airplane. The predetermined size is a value which may be set from an experimental value or from experience depending on the application of the radar device. The threshold is a value which may be set based on an experimental value or from experience depending on the type of the artificial mobile object.

In one embodiment, the radar device may further include a deleting module for deleting from the produced image data the area identified by the identifying module.

With this configuration, since the area containing the object of interest is deleted from the image data, when the image data is displayed, the object of interest can be inhibited from being displayed.

In one embodiment, the deleting module may include an adjustment module for adjusting a brightness of the image data in the area identified by the identifying module, and a subtracting module for subtracting the image data after the brightness adjustment from the area.

With this configuration, when the object of interest is deleted from the image data, the unnaturalness which typically arises when deleting the area can be suppressed.

In one embodiment, the deleting module may further include a smoothing module for smoothing the image data in the area identified by the identifying module. The adjustment module may adjust the brightness of the image data after the smoothing.

With this configuration, since the smoothing is performed when deleting the object of interest from the image data, the unnaturalness which typically arises when deleting the area can be suppressed.

In one embodiment, the radar device may further include, when a plurality of objects of interest are detected as a result of the pattern matching and a plurality of objects of interest are contained in the area identified by the identifying module, a setting module for setting representative points based on the plurality of objects of interest contained in the area, a measurement module for measuring the number of the set representative points as a crowd rate, and a distribution data generation module for producing a distribution data of the objects of interest based on the crowd rate measured by the measurement module.

This configuration shows a particular example of producing the distribution data in order to allow a user to easily and visually recognize a distribution state of the plurality of objects of interest.

In one embodiment, the radar device may further include a producing module for producing image data where the produced image data and the distribution data produced by the distribution data generation module are combined.

With this configuration, from the image data resulting from the combination of the image data produced based on the echo signals and the distribution data, the distribution state of the objects of interest can be more easily recognized by the user.

In one embodiment, the measurement module may further include a module for changing the crowd rate into a different value when the number of the representative points is below a threshold.

With this configuration, in order to eliminate unnecessary processing, the distribution data is not produced when the number of representative points is few.

In one embodiment, the radar device may further include a module for changing the crowd rate into a different value when the representative points are distributed one-dimensionally.

With this configuration, in case the object of interest is a natural target (e.g., animals), when the representative points are distributed one-dimensionally, as the target is likely to be an artificial target, the distribution data is not produced in order to eliminate unnecessary processing.

According to another aspect of the present invention, a method, of causing a radar device to detect an object of interest from image data produced based on an input signal containing echo signals caused by transmitted signals reflecting on objects, is provided. The method includes performing pattern matching of template image data produced based on one or more characteristics of the echo signals of the object of interest and stored in a memory module, and the image data, and identifying an area within the image data containing the object of interest corresponding to the template image data, when the object of interest is detected from the image data as a result of the pattern matching.

With this configuration, even if the image data is produced from the echo signals according to two or more objects, it can detect only the object of interest by the pattern matching between the image data and the template image data. Moreover, since the template image data is produced based on one or more characteristics of the echo signals of the object of interest, its accuracy for detecting the object of interest improves by the pattern matching.

According to another aspect of the present invention, a computer-readable program is provided, which causes a computer to detect an object of interest from image data produced based on an input signal containing echo signals caused by transmitted signals reflecting on objects. The program includes causing a computer to store template image data produced based on one or more characteristics of the echo signals of the object of interest, causing a computer to perform pattern matching of the image data and the template image data, and causing a computer to identify an area within the image data containing the object of interest corresponding to the template image data, when the object of interest is detected from the image data as a result of the pattern matching.

With this configuration, even if the image data is produced from the echo signals according to two or more objects, it can detect only the object of interest by the pattern matching between the image data and the template image data. Moreover, since the template image data is produced based on one or more characteristics of the echo signals of the object of interest, its accuracy for detecting the object of interest improves by the pattern matching.

According to the above aspects of the present invention, even if the image data is produced based on the echo signals of two or more objects, it becomes possible to detect only the object of interest by the pattern matching of the image data and the template image data.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, several embodiments of a radar device, an object of interest detecting method, and an object of interest detection program according to the present invention will be described with reference to the accompanying drawings. In the following embodiments, the radar device is, but not limited to be, carried on a ship. In the following embodiments, a flying object and/or an animal in the claims are explained as, but not limited to, a "bird." In the following embodiments, an immobile object in the claims is described in detail as, but not limited to, "land." In the following embodiments, an artificial mobile object in the claims is described in detail as, but not limited to, a "ship."

Note that the radar device according to the present invention may also be applied to, for example, monitoring instruments in an airport, other than the radar device of a ship. Moreover, an object of interest in the claims may be changed or modified suitably according to the application of the radar device, such as to an animal, a plant, etc. For example, the flying object in the claims may also be, other than the bird, a piece of hail, a balloon, etc. The animal in the claim may also be a "small animal" such as a fox or a weasel, and the immobile object in the claims may also be a "building." Moreover, the artificial mobile object in the claims may also be an "airplane."

Embodiment 1

The radar device according to a first embodiment of the invention defines the surroundings of a ship which carries the radar device (hereinafter, simply referred to as "the ship") as a detection area. The radar device repeatedly emits an electromagnetic wave with a short wavelength around the ship while changing the emitting bearing, and receives reflection waves reflected on objects within the detection area, such as land, other surface ships, or birds. The radar device produces an image of the detection area based on the received reflection waves, detects one or more birds from the produced image, and removes the bird(s) from the image. Thereby, with an image from which the bird(s) are removed, a user can easily catch information on objects needed for the navigation of the ship, such as land or other surface ships.

Figure 1:
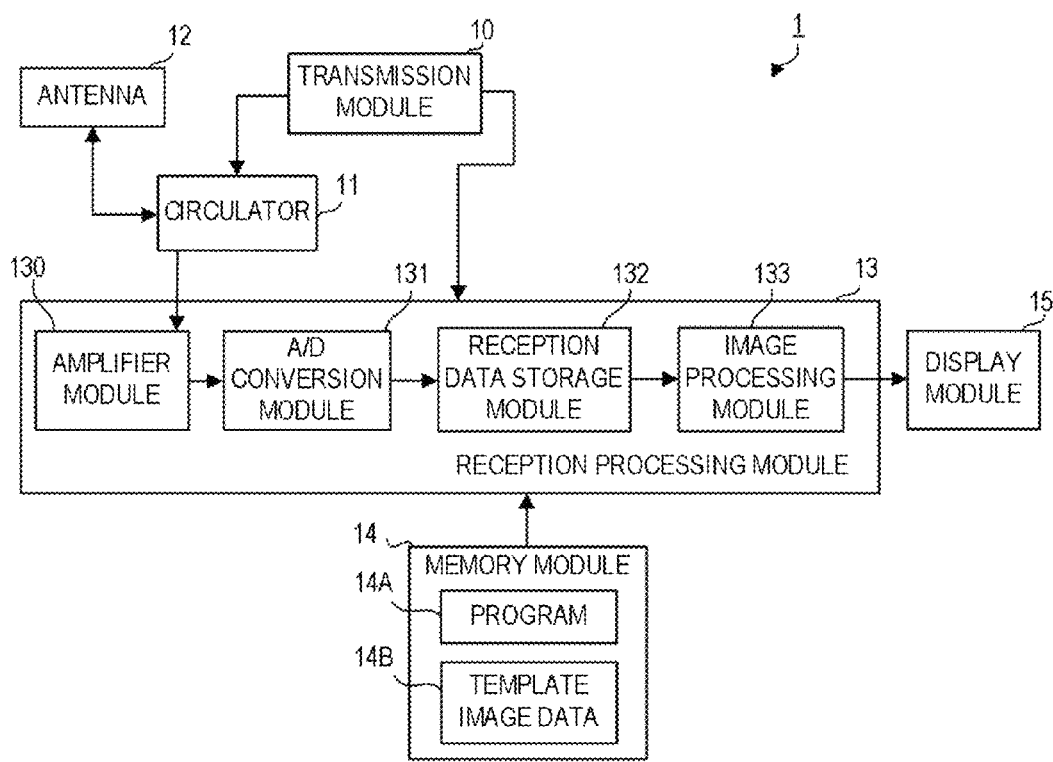
FIG. 1 is a block diagram showing a configuration of a radar device according to a first embodiment of the present invention.

FIG. 1 is a block diagram showing a configuration of the radar device of this embodiment. The radar device 1 includes a transmission module 10, a circulator 11, an antenna 12, a reception processing module 13, a memory module 14, and a display module 15. The memory module 14 may include a ROM (Read Only Memory) and stores therein a computer readable/executable program 14A and various data 14B (for example, template image data, which will be described later in details) required for operating the radar device 1.

The transmission module 10 is controlled to output a pulse signal at predetermined timings, and it outputs the pulse signal to the circulator 11 at a preset timing using a reference frequency signal.

The circulator 11 transmits the pulse signal outputted from the transmission module 10 to the antenna 12. The antenna 12 is equipped on the ship, and it emits the pulse signal, which is inputted through the circulator 11, to the exterior of the antenna 12 with predetermined directivity, while rotating in a horizontal plane at a predetermined revolving speed. Moreover, the antenna 12 receives the echo signal which is caused by the pulse signal emitted by the antenna 12 being reflected on an object within the detection area, and outputs the echo signal to the circulator 11. The circulator 11 transmits the echo signal outputted from the antenna 12 to the reception processing module 13.

The reception processing module 13 is, but not limited to, a microcomputer in this embodiment, and executes the program 14A stored in the memory module 14 to detect the echo signal inputted through the circulator 11 (input signal) and produces the image data of the detection area. The reception processing module 13 includes an amplifier module 130, an A/D conversion module 131, a reception data storage module 132, and an image processing module 133. Note that the reception processing module 13 may be incorporated into the memory module 14.

The amplifier module 130 amplifies the echo signal inputted from the antenna 12 through the circulator 11. The amplifier module 130 outputs the amplified echo signal to the A/D conversion module 131. The A/D conversion module 131 converts the echo signal amplified by the amplifier module 130 from analog data to digital data at a predetermined sampling rate to form the reception data containing a predetermined number of bits, and outputs the digital data to the reception data storage module 132.

The reception data storage module 132 includes a so-called sweep memory. The reception data storage module 132 stores the A/D converted reception data for one sweep in real time and it stores the reception data for the one sweep before the reception data is overwritten by the reception data obtained in the next sweep. More specifically, the reception data storage module 132 stores the reception data for one sweep at a time so that the sequentially-inputted reception data are arranged from the proximal to the distal range (that is, the reception data are arranged in a distance direction starting from the ship location). In this case, the reception data storage module 132 includes a plurality of sweep memories to store the reception data for a plurality of sweeps arranged according to the azimuth.

The image processing module 133 reads out the reception data as needed from the reception data storage module 132 and produces the image data. Moreover, the image processing module 133 deletes the image corresponding to a bird(s) from the produced image data, and outputs the image data after the deletion to the display module 15. The image processing module 133 will be described in more detail later.

The display module 15 displays the image data outputted from the image processing module 133 as a result of object detection within the detection area. At this time, the display module 15 displays the image from which bird(s) is deleted from the detection area. Note that the display module 15 may be provided separately from the radar device 1.

Next, the image processing module 133 is described in greater detail.

The image processing module 133 performs pattern matching of the image data produced based on the echo signals received by the antenna 12 (hereinafter, referred to as "the input image data") and template image data 14B stored in the memory module 14. The template image data 14B is a template image data of bird(s). The image processing module 133 performs the pattern matching to extract (identify) an area where the bird(s) are contained from the input image data. The image processing module 133 produces the image data (hereinafter, referred to as "the output image data") from which the extracted area is deleted from the input image data, and outputs it to the display module 15. Thereby, the image where the bird(s) are deleted from the detection area is displayed on the display module 15.

Below, the bird template image data 14B stored in the memory module 14 is described in greater detail.

The bird template image data 14B is produced based on features (characteristics) of the echo signal of the object, which is typically different for each kind of object. Below, the echo signal reflected on land, a ship, and a bird is referred to as "the land echo signal," "the ship echo signal," and "the bird echo signal," respectively.

Figure 2:
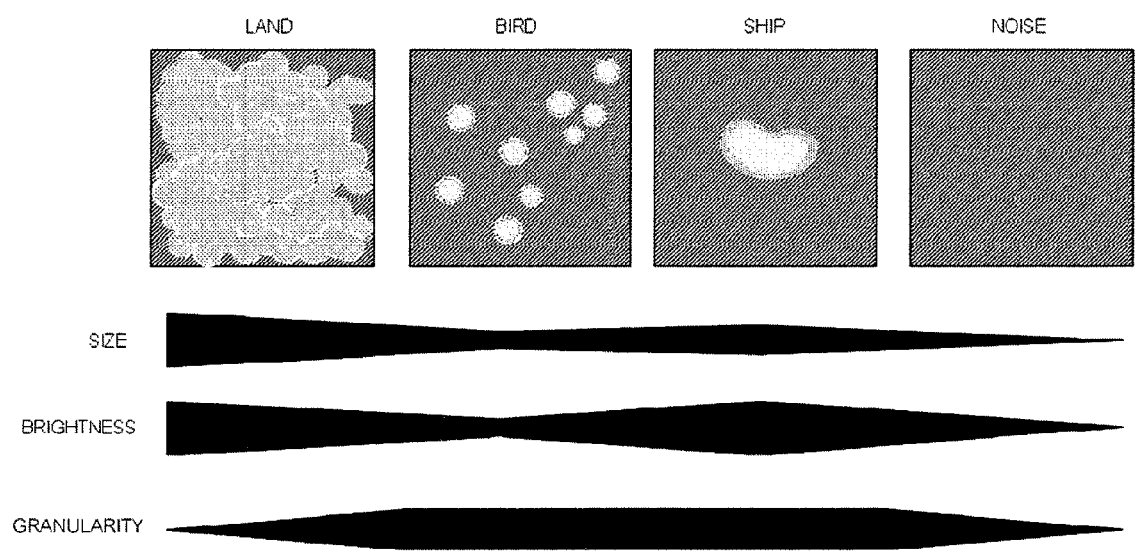
FIG. 2 is schematic diagrams showing features of echo signals of different types of objects.

FIG. 2 is a schematic diagram showing the echo signal features of each kind of the objects. The upper part of FIG. 2 shows square images of the same size which are produced based on the land echo signals, the bird echo signals, the ship echo signals, and the noise signals, respectively. Note that the image produced based on the bird echo signals shown in FIG. 2 is represented as an image produced based on the echo signals reflected on a crowd of birds. Moreover, the lower part of FIG. 2 shows the feature value such as the sizes of the objects, the brightness and the granularity (particle size) of the image data.

The size of an object is determined by a pulse width of the echo signals received by the antenna 12, and the size of a bird is smaller than the sizes of land and a ship. The brightness of the image data is a peak value of a signal strength of the echo signals received by the antenna 12, and the brightness of the bird image data is less than the brightness of land and ship image data. The granularity of the image data is the ratio of the area (number of pixels) corresponding to an object with respect to the area (number of pixels) of a fixed-size image (i.e., a density), and the granularity becomes higher as the density (the ratio) becomes smaller. For example, as shown in FIG. 2, the hatched portion indicates an area where no objects exist. Since land is normally larger than a bird, the hatched portion of the land image data is smaller than that of the bird image data.

For this reason, the granularity of the bird image data is larger than that of the land image data. Note that the granularity may also be a density of the echo signals within a fixed-size area. For example, since land is significantly larger than a bird, the antenna 12 typically receives more land echo signals than bird echo signals. Therefore, the echo density of bird(s) is lower than that of land.

The bird template image data 14B is produced using the features of the echo signals as described referring to FIG. 2. The following equation indicates a general two-dimensional Gaussian distribution. In this equation, (x, y) represents a location of a pixel in two-dimensional image data, and σ is a standard deviation.

$$Lv_{Normalize}(x, y) = \frac{1}{2\pi\sigma^2} \exp\left(-\frac{x^2 + y^2}{2\sigma^2}\right) \quad (1)$$

In order to produce the bird template image data 14B, the above Equation (1) is transformed as the following equation so as to approximate to the features of the bird echo signal described referring to FIG. 2.

$$Lv(x, y), = \text{MAX}\left(\left(O, \text{ MIN}\left(255, Lvp\frac{Lv_{Normalize}}{Lvp_{Normalize}} + Ofs\right)\right)\right) \quad (2)$$

In Equation (2), offset (Ofs) and peak value (Lvp) are respectively the granularity and the brightness of the bird template image data 14B to be produced. If the offset (Ofs) is set larger than a threshold, the hatched portion in the image shown in FIG. 2 can be increased to increase the granularity, and if the peak value (Lvp) is set lower than a threshold, the brightness can be lowered. The thresholds for the offset (Ofs) and the peak value (Lvp) are set to optimum values for bird(s) according to experimental values or from experience.

Moreover, MAX and MIN values in Equation (2) are to set the maximum and minimum values (a range within 0-255) of the pixel value, respectively. The template image data 14B is produced based on the bird echo signals and by utilizing the numerical values in the two-dimensional Gaussian distribution of Equation (2).

Figure 3:
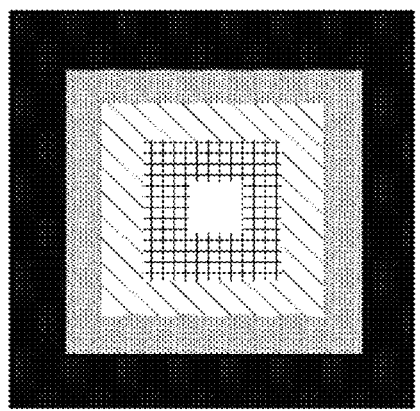
FIG. 3 is views showing an example template image data which is produced.
Figure 3:
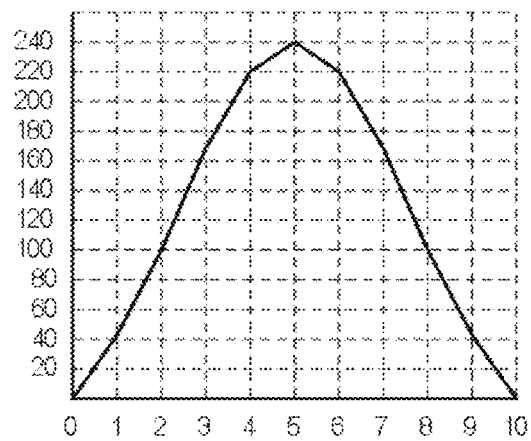

FIG. 3 is a view showing an example of the produced template image data 14B. The right part of FIG. 3 shows the Gaussian distribution of the image when the image data is produced based on the bird echo signals. The left part of FIG. 3 shows the template image data 14B obtained using the right part of FIG. 3 and from Equation (2), where the size of the image is 11×11 pixels, the offset is 30, and the peak value is 270.

Note that the template image data 14B may be produced in advance and stored in the memory module 14, or may be produced by the image processing module 133 and stored in the memory module 14 during an initial operation of the radar device 1. Alternatively, in order to optimize the pattern matching (described below in detail), the template image data 14B may be periodically produced by changing the parameters of Equation (2). Alternatively, when generating the template image data 14B in the radar device 1, the radar device 1 may be configured so that the parameters are inputted from a user interface (not illustrated) provided to the radar device 1.

Figure 4:
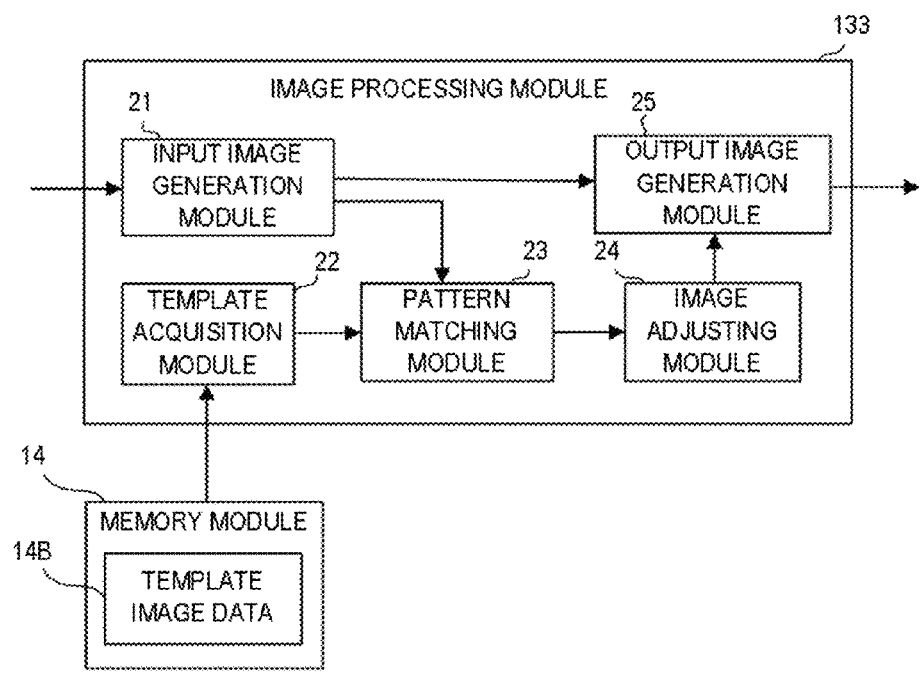
FIG. 4 is a block diagram schematically showing functions of an image processing module.

FIG. 4 is a block diagram schematically showing functions of the image processing module 133. The image processing module 133 has functional modules, such as an input image generation module 21, a template acquisition module 22, a pattern matching module 23 (identifying module), an image adjusting module 24, and an output image generation module 25.

Figure 5:
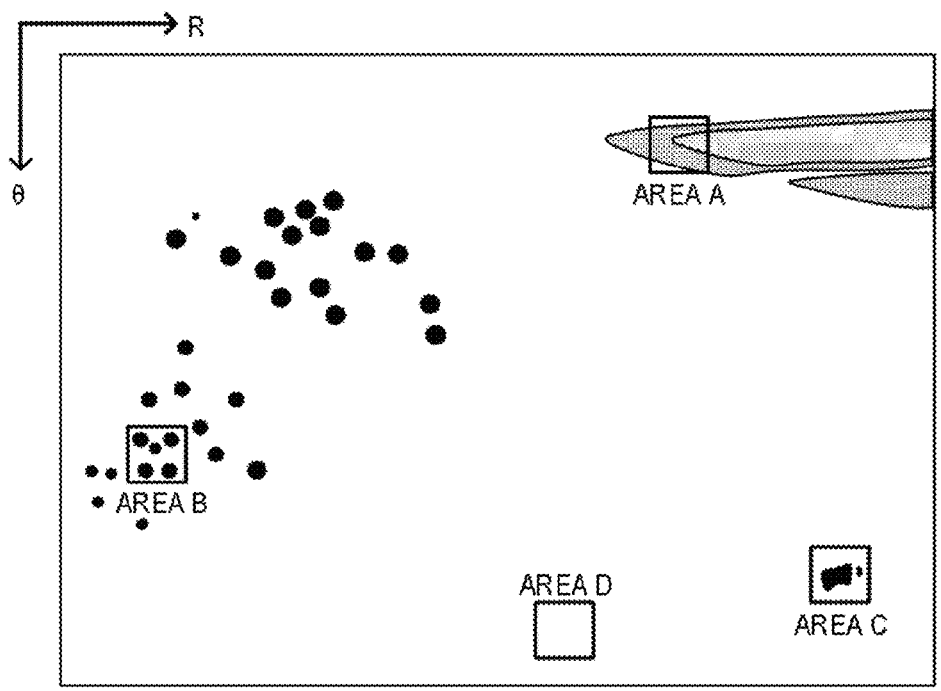
FIG. 5 is a view showing an example image according to input image data produced based on the echo signals.

The input image generation module 21 produces the input image data based on the echo signals received by the antenna 12. FIG. 5 is a view showing an example image of an input image data produced based on the echo signals. The image shown in FIG. 5 is produced based on the echo signals reflected on various objects around the ship, containing noise signals, where land (an area A in the drawing), birds (an area B), a ship (an area C), noise (an area D) are shown.

The template acquisition module 22 acquires the template image data 14B (refer to FIG. 3) stored in the memory module 14.

The pattern matching module 23 performs pattern matching between the input image data produced by the input image generation module 21 and the template image data 14B acquired by the template acquisition module 22, and extracts the image data of bird(s) from the input image data. In more detail, the pattern matching module 23 superimposes the template image data 14B on the input image data, and calculates a correlation coefficient. The pattern matching module 23 then shifts the superimposed template image data 14B by one pixel at a time, and then, again calculates a correlation coefficient. The pattern matching module 23 repeats the calculation to detect an area where the correlation coefficient becomes the maximum, and defines the area as the bird image data.

Figure 6:
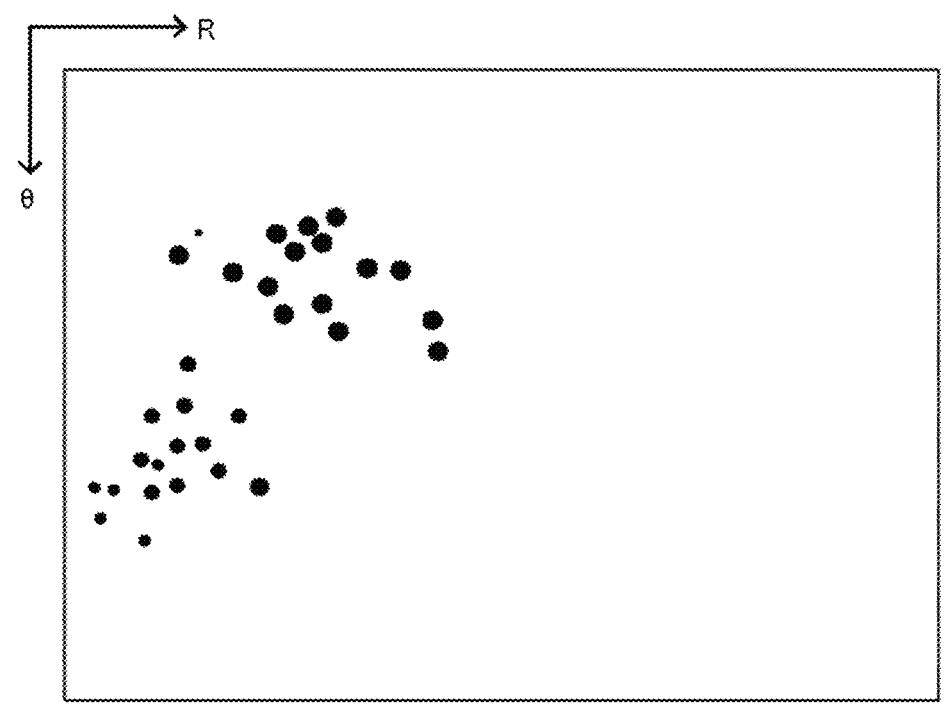
FIG. 6 is a view showing an image according to image data of birds extracted from the input image data.

FIG. 6 is a view showing an image containing the bird image data which is extracted from the input image data. The image of FIG. 6 indicates mostly only the birds after the land, ship, and noise are suppressed from the image of FIG. 5.

Note that the pattern matching module 23 may perform the pattern matching, while shifting two or more pixels at a time, rather than shifting one pixel at a time as described above. In this case, a throughput of the pattern matching can be reduced and, thus, a processing speed of the pattern matching module 23 can be boosted.

The image adjusting module 24 applies a mask to the bird image data (refer to FIG. 6) extracted by the pattern matching module 23. If the bird template image data 14B is smaller than the bird image data of the input image data, simply subtracting the bird template image data 14B from the input image data alone may cause the contour of the subtracted area to unnaturally stand out.

For this reason, the image adjusting module 24 smoothes the contour of the birds within the image shown in FIG. 6 by lessening the tiny variations of the gray scale value between pixels. The smoothing scope can be determined based on experiment or from experience, and can be changed appropriately. Next, the image adjusting module 24 adjusts the brightness of each pixel which typically decreases due to the smoothing (e.g., the brightness is adjusted to be doubled).

The output image generation module 25 subtracts the image data of FIG. 6 adjusted by the image adjusting module 24 from the input image data of FIG. 5 to produce output image data. The output image data produced by the output image generation module 25 is outputted to the display module 15, where the data is displayed on a screen.

Figure 7:
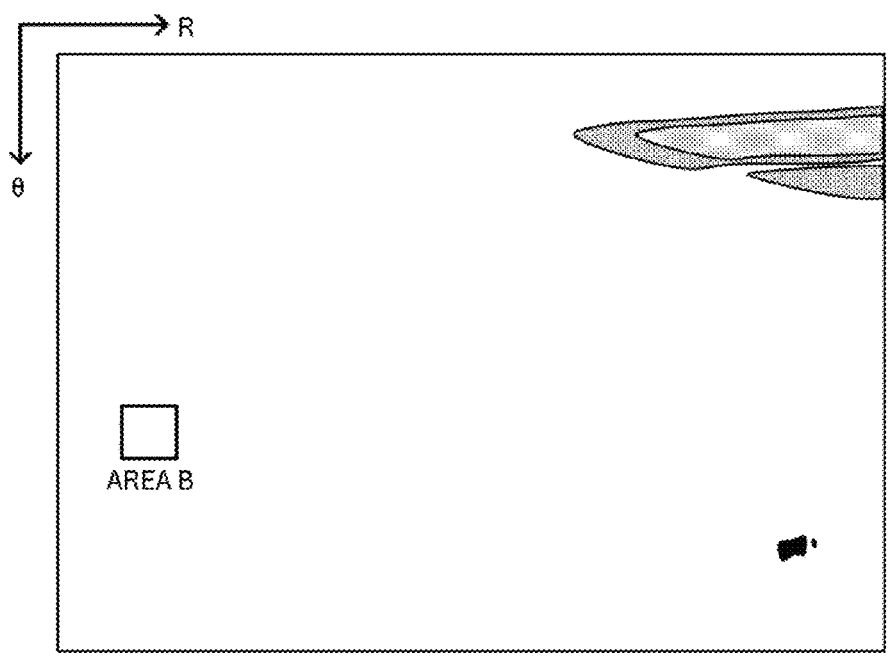
FIG. 7 is a view showing an image according to output image data.

FIG. 7 is a view showing the image according to the output image data. FIG. 7 shows an image from which the bird images near the area B are suppressed compared with the image shown in FIG. 5.

Figure 8:
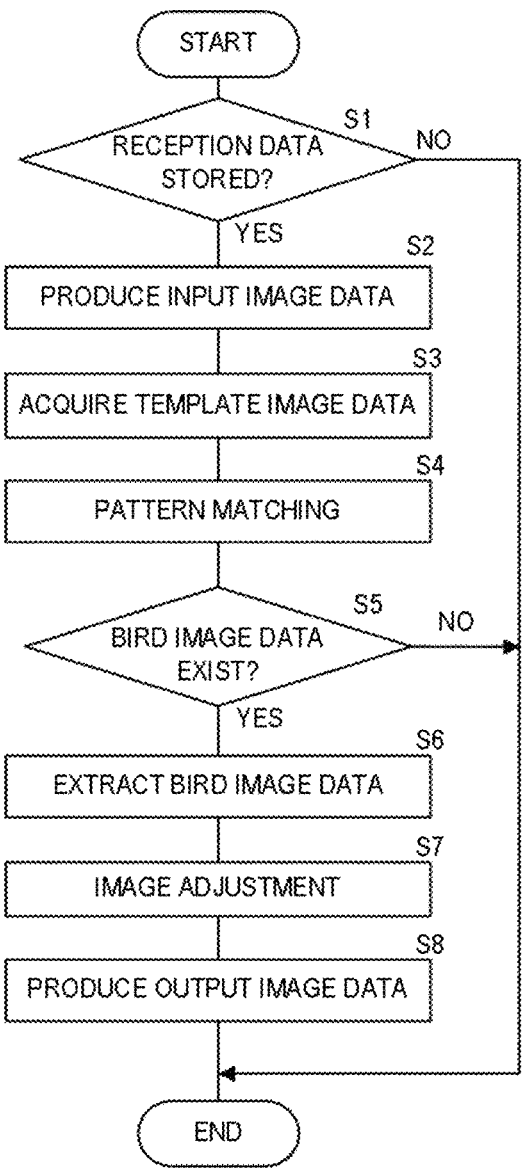
FIG. 8 is a flowchart showing processing procedures executed by the image processing module.

Next, operations executed in the radar device 1 is described. FIG. 8 is a flowchart showing processing procedures executed by the image processing module 133.

The image processing module 133 determines whether the reception data is stored in the reception data storage module 132 (S1). If the reception data is not stored (S1: NO), the image processing module 133 ends this routine. If the reception data is stored (S1: YES), the image processing module 133 acquires the reception data from the reception data storage module 132 to produce the input image data (refer to FIG. 5) (S2). Then, the image processing module 133 acquires the bird template image data 14B (refer to FIG. 3) stored in the memory module 14 (S3).

The image processing module 133 performs the template matching between the input image data and the template image data 14B (S4), and determines whether the bird image data is detected in the input image data (S5). If not detected (S5: NO), the image processing module 133 ends this routine. In this case, the image processing module 133 outputs the input image data as output image data as it is to the display module 15. If the bird image data is detected in the input image data (S5: YES), the image processing module 133 extracts the bird image data from the input image data, as shown in FIG. 6 (S6).

The image processing module 133 performs the image adjustment of the extracted bird image data (S7). As described above in detail, the image processing module 133 performs the smoothing, where the tiny variations of the gray scale value between pixels in the contour of the bird(s) contained in the extracted bird image data are lessened, and adjusts the brightness that fell due to the smoothing. Then, the image processing module 133 subtracts the image data after the image adjustment at S7 from the input image data to produce output image data (S8) and, then, ends this routine.

As described above, in this embodiment, the bird(s) which may be unnecessary can be removed from the image of the detection area by performing the pattern matching between the input image data and the bird template image data 14B. As a result, the user can visually recognize locations of necessary objects, such as other ships, land, and/or the distance of the objects from the ship by viewing the displayed image. Moreover, since the template image data 14B is produced based on the features of the bird echo signals, the detection accuracy of the bird image data can be raised by template matching.

In this embodiment, the bird(s) are deleted from the input image data by subtracting the smoothed bird image data from the input image data. However, the bird(s) may be deleted from the input image data by detecting the bird area(s) from the input image data and adjusting the brightness of the area(s) according to the brightness of the surrounding area(s). For example, the bird(s) in the area B may be deleted by changing the brightness of the area B to be the same as the surrounding brightness in FIG. 5.

Embodiment 2

A radar device of this embodiment is the same as that of the previous embodiment in that bird(s) is detected based on the input image data; however it is different in that it determines whether the detected bird(s) are a crowd of birds and then combines a distribution map of the bird(s) with the input image data to allow a user to easily recognize the crowd of birds. In this way, when the user recognizes the crowd of birds, he/she may be able to predict the existence of a fish school below the crowd of birds. Below, the difference from the previous embodiment is described in greater detail.

Figure 9:
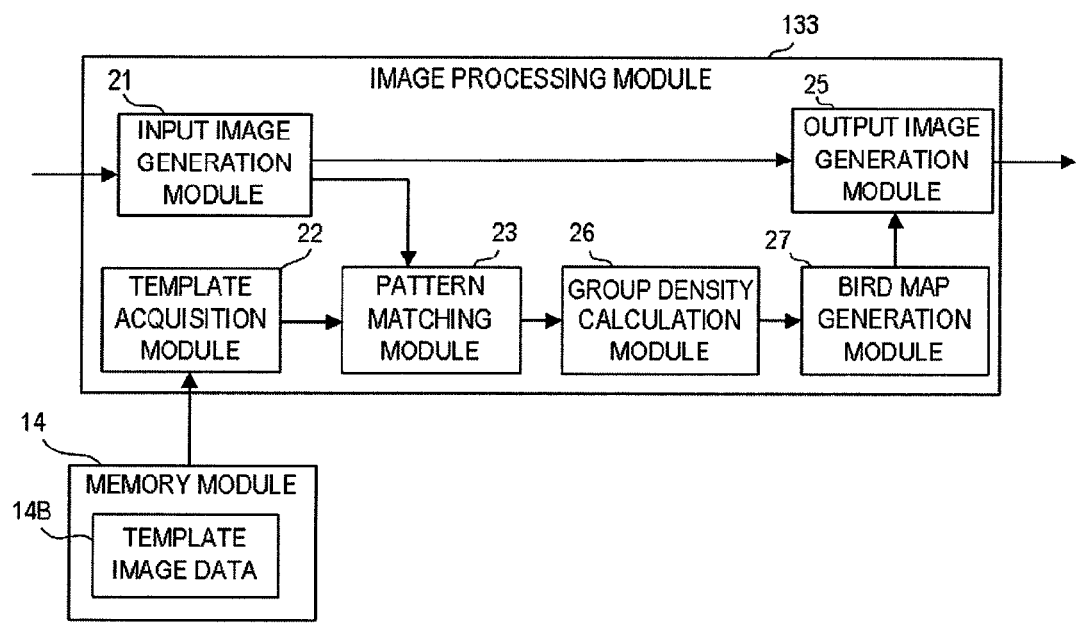
FIG. 9 is a block diagram schematically showing functions of the image processing module according to another embodiment of the present invention.

FIG. 9 is a block diagram schematically showing functions of an image processing module 133 of this embodiment. The image processing module 133 includes functions of a group density calculation module 26 and a bird map generation module 27, in addition to the functions described in the previous embodiment including the input image generation module 21, the template acquisition module 22, the pattern matching module 23, and the output image generation module 25.

The group density calculation module 26 binarizes the bird image data extracted from the input image data by the pattern matching module 23, based on a threshold (which may be changed suitably according to a detection location, time, etc.), and then labels the binarized data. The labeling includes analyzing color information of each pixel contained in the image and applying the same label to coupled pixels (having the same color) to classify two or more areas as one group.

Figure 10:
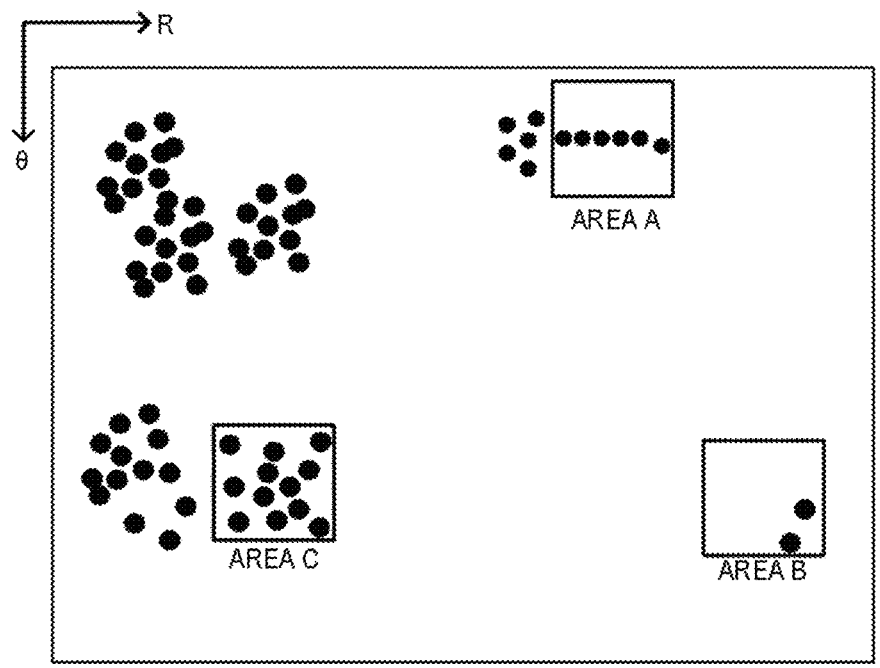
FIG. 10 is a view showing an image according to image data of birds extracted from the input image data.

FIG. 10 is a view showing an image resulting of the labeling process of a bird image data. Note that, although the image shown in FIG. 10 is extracted based on the bird template image data 14B, it also contains target echoes other than birds, for example, buoys, bank, or noise, which are similar to the template image data 14B. Based on the labeling results, the group density calculation module 26 selects a representative point (representative pixel) (black dots in the drawing) within each classified group, counts the number of the representative points contained in a fixed-sized area (line blocks in the drawing), and sets the count result as the group density of the birds.

The group density calculation module 26 changes the calculated group density according to the distribution of the representative points within the area. For example, since the representative points are distributed one-dimensionally in the area A of FIG. 10, the group density calculation module 26 determines with high probability that the object within the area A is an artificial object, such as a bank. In this case, the group density calculation module 26 sets the group density to "0." Moreover, since the number of the representative points is less than the threshold (for example, five) in the area B, the group density calculation module 26 determines with high probability that the object(s) is noise or one or two birds and, thus, it sets the group density to "0." Since the representative points are distributed two-dimensionally in the area C, the group density calculation module 26 determines with high probability that the objects are a crowd of birds, and sets the counted number of the representative points to the group density. Alternatively, the group density calculation module 26 may form areas sequentially from the end of the image shown in FIG. 10 and count the representative points, or, the group density calculation module 26 may detect a portion where the representative points are concentrated, form the area surrounding the portion, count the representative points, and set the counted number as the group density.

Figure 11:
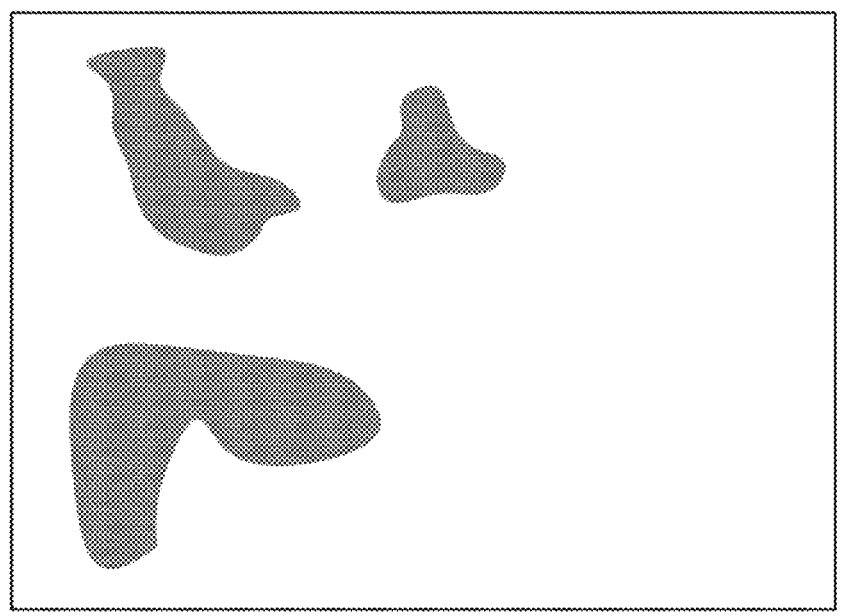
FIG. 11 is a view showing a bird map produced by a bird map generation module.

The bird map generation module 27 produces a bird map based on the group density calculated by the group density calculation module 26. The bird map is image data where the brightness of the high group density area within the bird image data is increased, and is distribution data of birds. For example, the bird map generation module 27 produces a bird map based on the brightness within the area where the group density is calculated, and can be obtained by multiplying the brightness calculated using the above Equation (2) by the group density. FIG. 11 is a view showing the bird map produced by the bird map generation module 2. As shown in FIG. 11, the area where the brightness is high indicates an area where the group density of birds is high (i.e., an area where many birds exist).

Figure 12:
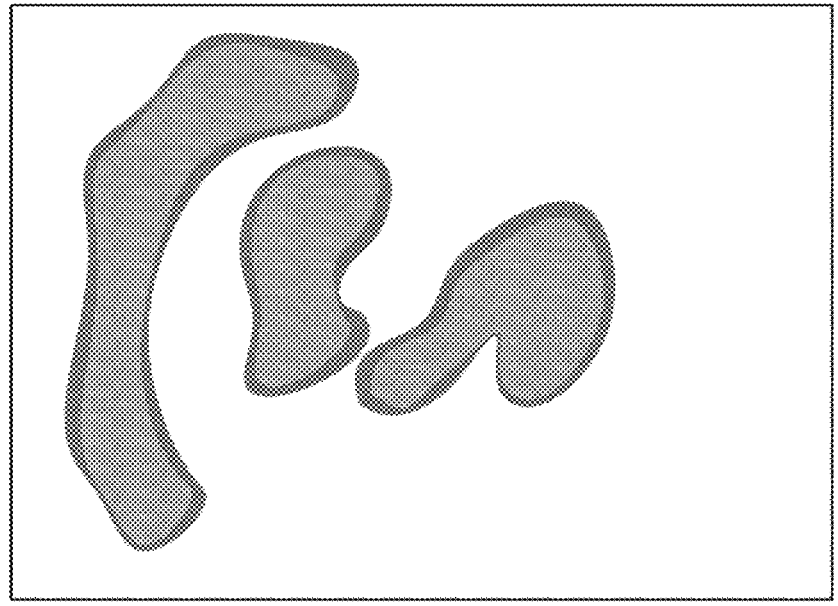
FIG. 12 is a view showing an example output image data where the bird map is combined.
Figure 13:
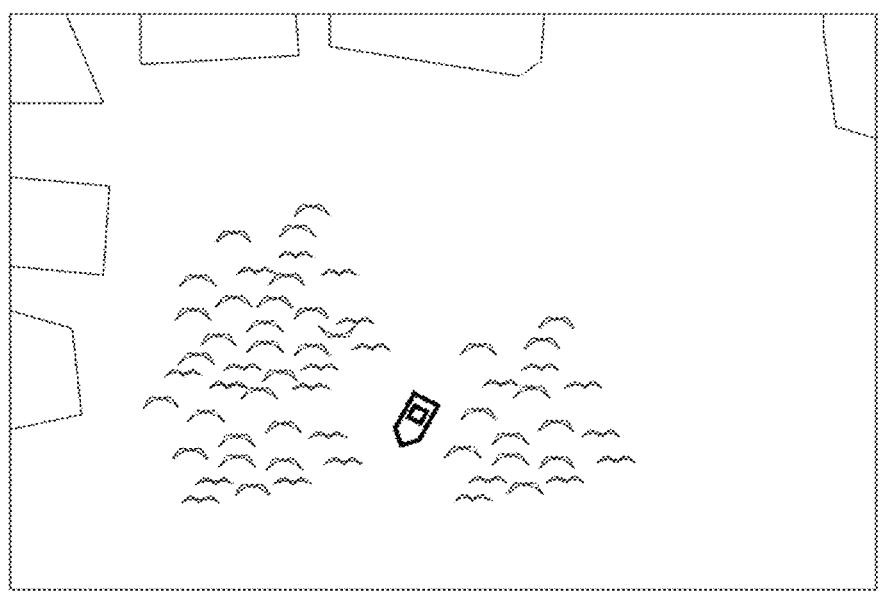
FIG. 13 is a view showing another example output image data where the bird map is combined.

The output image generation module 25 combines the input image data produced by the input image generation module 21 and the bird map produced by the bird map generation module 27 to produce output image data. FIGS. 12 and 13 are views showing an example of output image data after combination of a bird map and an input image data. Alternatively, the output image generation module 25 may produce the output image data by increasing the brightness of the area where the crowd of birds is present in the input image data, as shown in FIG. 12. Alternatively, as shown in FIG. 13, the output image generation module 25 may produce an animated output image data, the output image data being the result of the combination of an input image data and a bird map.

Figure 14:
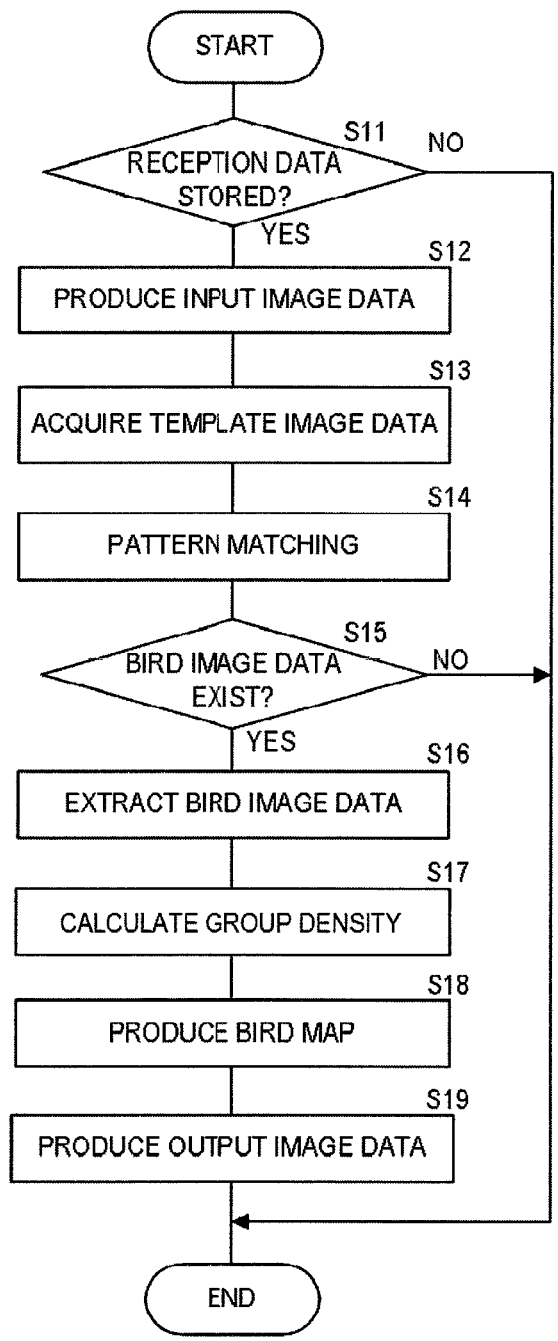
FIG. 14 is a flowchart showing processing procedures executed by the image processing module of this embodiment.

Next, operations executed in the radar device 1 are described in greater detail. FIG. 14 is a flowchart showing processing procedures executed by the image processing module 133.

The image processing module 133 determines whether the reception data is stored in the reception data storage module 132 (S11). If the reception data is not stored (S11: NO), the image processing module 133 ends this routine. If the reception data is stored (S11: YES), the image processing module 133 acquires the reception data from the reception data storage module 132 as needed, and produces the input image data (refer to FIG. 5) (S 12). Then, the image processing module 133 acquires the bird template image data 14B (refer to FIG. 3) stored in the memory module 14 (S13).

The image processing module 133 performs the template matching of the input image data and the template image data 14B (S14), and determines whether the bird image data is detected from the input image data (S15). If not detected (S15: NO), the image processing module 133 ends this routine. In this case, the image processing module 133 outputs the input image data as the output image data to the display module 15. If the bird image data is detected in the input image data (S15: YES), the image processing module 133 extracts the bird image data from the input image data, as shown in FIG. 6 (S 16).

The image processing module 133 calculates the group density based on the extracted bird image data (S17). In detail, as described above, the image processing module 133 calculates the representative points in the image data, for example, by the labeling, counts the number of the representative points, and sets the counted number to the group density. Note that, at S17, the image processing module 133 changes the calculated group density, when the representative points are distributed one-dimensionally or when the number of the representative points are few. Next, the image processing module 133 produces the bird map shown in FIG. 11 based on the calculated group density (S18). The image processing module 133 produces the output image data where the input image data and the bird map are combined (S19), and then ends this routine.

As described above, in this embodiment, birds are detected by performing the pattern matching of the input image data and the bird template image data 14B. Then, the image data of the birds is produced in the image of the detection area so that the user can easily recognize a crowd of birds by viewing the produced bird image data. As a result, the user can predict the presence of a fish school which may be below the crowd of birds.

In the above, although suitable embodiments of the present invention are described in detail, each configuration and operation of the embodiments may be suitably modified without any limitations. For example, in the above embodiments, the image processing module 133 performs the processing for each input image data. However, the image processing module 133 may reduce the size or resolution of the input image data and then perform the processing on the reduced image data.

Figure 15:
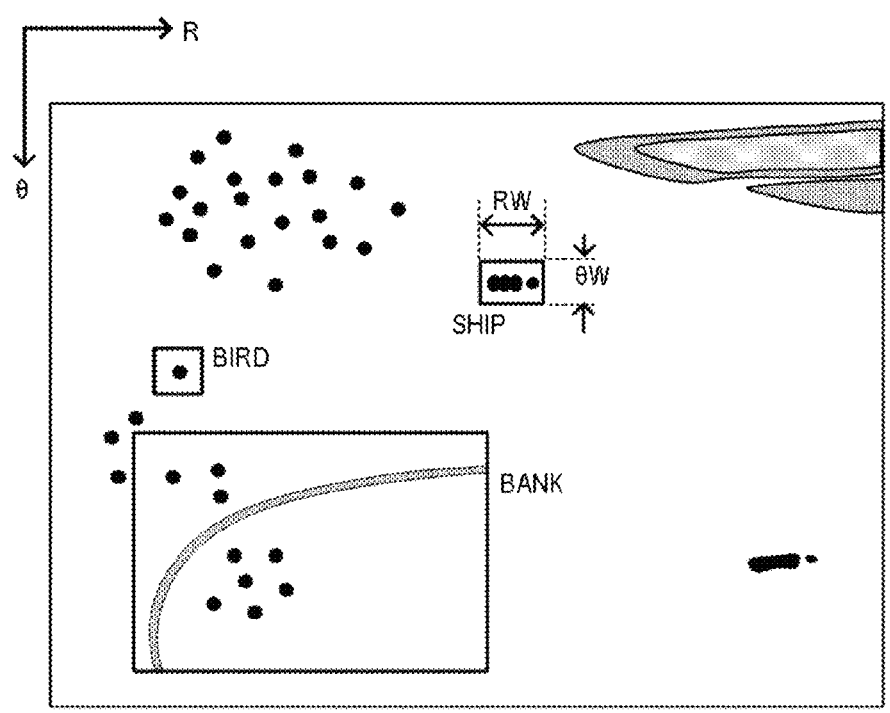
FIG. 15 is a view illustrating an example elimination of echo signals according to non-bird objects.

Alternatively, in combination with the pattern matching, the image processing module 133 may eliminate echo signal(s) with a high possibility of not being bird(s), based on an aspect ratio of the echo signal(s), for example, by the labeling. FIG. 15 is a view illustrating an example of eliminating non-birds echo signals. The aspect ratio can be expressed by RW (radial width)/θW (azimuthal width) (or, conversely, θW/RW). Since a bird is very small, the aspect ratio is defined with RW=a pulse length and θW=a electromagnetic wave azimuthal width. Therefore, echo signals with an aspect ratio greatly different from the bird aspect ratio will be eliminated as these echo signals are very unlikely to be bird echo signals. For example, in FIG. 15, the bird aspect ratio is about 1.0 and the bank and ship aspect ratio is greater than 1.0. In this case, the image processing module 133 eliminates bank and ship echo signals.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is designed in at least that way, but may also be configured in ways that are not listed.

What is claimed is:

1. A radar device for detecting an object of interest from image data produced based on an input signal containing echo signals caused by transmitted signals reflecting on objects, the radar device comprising:
   a memory module for storing template image data produced based on one or more characteristics of the echo signals of the object of interest;
   a pattern matching module for performing pattern matching of the image data and the template image data; and
   an identifying module for identifying an area within the image data containing the object of interest corresponding to the template image data, when the object of interest is detected from the image data as a result of the pattern matching,
   wherein the template image data is produced based on pulse width and signal strength of the echo signals corresponding to the object of interest, and based on a density of the echo signals corresponding to the object of interest with respect to the input signal.

2. The radar device of claim 1, wherein the template image data is produced based on a combination of a size of the object of interest, a brightness of the image data when the image data is produced based on the echo signals reflected on the object of interest, and a granularity indicative of a density of the image data with respect to the image data produced based on the input signal.

3. The radar device of claim 2, wherein, when the object of interest is a flying object, the template image data is produced so that the brightness of the image data is below a threshold and the granularity of the image data is above a threshold.

4. The radar device of claim 2, wherein, when the object of interest is an animal, the template image data is produced so that the brightness of the image data is below a threshold and the granularity of the image data is above a threshold.

5. The radar device of claim 2, wherein, when the object of interest is an immobile object, the template image data is produced so that the brightness of the image data is above a threshold and the granularity of the image data is below a threshold.

6. The radar device of claim 2, wherein, when the object of interest is an artificial mobile object, the template image data is produced so that the brightness of the image data is above a threshold and the granularity of the image data is above a threshold.

7. A radar device for detecting an object of interest from image data produced based on an input signal containing echo signals caused by transmitted signals reflecting on objects, the radar device comprising:
   a memory module for storing template image data produced based on one or more characteristics of the echo signals of the object of interest;
   a pattern matching module for performing pattern matching of the image data and the template image data;
   an identifying module for identifying an area within the image data containing the object of interest corresponding to the template image data, when the object of interest is detected from the image data as a result of the pattern matching; and
   a deleting module for deleting from the produced image data the area identified by the identifying module, wherein the deleting module includes
   an adjustment module for adjusting a brightness of the image data in the area identified by the identifying module; and
   a subtracting module for subtracting the image data after the brightness adjustment from the area.

8. The radar device of claim 7, wherein the deleting module further comprises a smoothing module for smoothing the image data in the area identified by the identifying module; and
   wherein the adjustment module adjusts the brightness of the image data after the smoothing.

9. A radar device for detecting an object of interest from image data produced based on an input signal containing echo signals caused by transmitted signals reflecting on objects, the radar device comprising:

a memory module for storing template image data produced based on one or more characteristics of the echo signals of the object of interest;

a pattern matching module for performing pattern matching of the image data and the template image data;

an identifying module for identifying an area within the image data containing the object of interest corresponding to the template image data, when the object of interest is detected from the image data as a result of the pattern matching; and when a plurality of objects of interest are detected as a result of the pattern matching and a plurality of objects of interest are contained in the area identified by the identifying module, a grouping module for grouping the plurality of objects of interest contained in the area based on analysis of color information of the image data;

a measurement module for measuring the number of the groups; and a distribution data generation module for producing a distribution data of the objects of interest based on the number of groups measured by the measurement module.

10. The radar device of claim 9, further comprising a producing module for producing image data where the produced image data and the distribution data produced by the distribution data generation module are combined.

11. The radar device of claim 9, wherein the measurement module further comprises a module for changing the crowd rate into a different value when the number of the representative points is below a threshold.

12. The radar device of claim 9, further comprising a module for changing the crowd rate into a different value when the representative points are distributed one-dimensionally.

* * * * *